(12) United States Patent
Brodziak

(10) Patent No.: US 10,344,824 B2
(45) Date of Patent: Jul. 9, 2019

(54) PIVOTABLE BLOCK LOCK

(71) Applicant: THIELE GMBH & CO. KG, Iserlohn (DE)

(72) Inventor: Eugeniusz Brodziak, Iserlohn (DE)

(73) Assignee: THIELE GmbH & CO. KG, Iserlohn (DE)

(*) Notice: Subject to any disclaimer, the term of this patent is extended or adjusted under 35 U.S.C. 154(b) by 0 days.

(21) Appl. No.: 15/768,159

(22) PCT Filed: Oct. 11, 2016

(86) PCT No.: PCT/DE2016/100471
§ 371 (c)(1),
(2) Date: Apr. 13, 2018

(87) PCT Pub. No.: WO2017/067536
PCT Pub. Date: Apr. 27, 2017

(65) Prior Publication Data
US 2018/0313433 A1    Nov. 1, 2018

(30) Foreign Application Priority Data

Oct. 20, 2015   (DE) .................. 10 2015 117 860

(51) Int. Cl.
| F16G 13/12 | (2006.01) |
| F16G 13/14 | (2006.01) |
| F16G 15/04 | (2006.01) |

(52) U.S. Cl.
CPC ............. *F16G 13/14* (2013.01); *F16G 13/12* (2013.01); *F16G 15/04* (2013.01)

(58) Field of Classification Search
CPC ........... F16G 13/14; F16G 15/04; F16G 13/12
(Continued)

(56) References Cited

U.S. PATENT DOCUMENTS 1,368,175 A * 2/1921 McFee .................... F16G 15/02
59/85
1,433,133 A    10/1922 Harte
(Continued)

FOREIGN PATENT DOCUMENTS

| DE | 357069 | 8/1922 |
| DE | 7310945 | 6/1973 |

(Continued)

OTHER PUBLICATIONS

International Search Report and Written Opinion of the ISA for PCT/DE2016/100471, dated Feb. 1, 2017, 11 pages.
(Continued)

*Primary Examiner* — David B Jones
(74) *Attorney, Agent, or Firm* — Nixon & Vanderhye P.C.

(57) ABSTRACT

A block lock for connecting two chain ends is disclosed including two opposing block lock halves extending in the longitudinal direction when the block lock is in the locked state, which interlockingly engage in each other, and which lock to form at least one receiving opening for receiving a chain link. The block lock halves are pivotably coupled together in the region of a pivoting end such that the block lock halves can be shifted into an open position or locked position by performing the pivoting movement. In the locked position, the block lock halves integrally engage in one another at an opposite locking end and can be locked.

11 Claims, 10 Drawing Sheets

(58) Field of Classification Search
USPC .................................................... 59/85, 86
See application file for complete search history.

(56) References Cited

U.S. PATENT DOCUMENTS

| | | | |
|---|---|---|---|
| 1,519,212 A | 12/1924 | Mitchell | |
| 1,646,135 A * | 10/1927 | Black | F16G 15/02 |
| | | | 59/85 |
| 4,525,994 A | 7/1985 | Alt et al. | |

FOREIGN PATENT DOCUMENTS

| | | |
|---|---|---|
| DE | 7 801 526 | 3/1981 |
| DE | 299 05 676 | 8/2000 |
| DE | 10 2009 004 266 | 7/2010 |
| DE | 10 2009 050 078 | 4/2011 |
| DE | 20 2012 103 455 | 9/2012 |
| DE | 20 2014 103 197 | 7/2014 |
| DE | 20 2015 101 618 | 4/2015 |
| FR | 501 840 | 4/1920 |
| FR | 501849 | 4/1920 |
| FR | 597566 | 11/1925 |
| GB | 138632 | 7/1920 |
| GB | 155142 | 12/1920 |
| JP | 04-7755 | 1/1992 |
| JP | 06-280845 | 10/1994 |
| JP | H08170627 | 7/1996 |
| RU | 153296 | 7/2015 |
| WO | WO 2013/163280 | 10/2013 |

OTHER PUBLICATIONS

Search Report for DE 10 2015 117 860.5, dated Dec. 22, 2016, 12 pages.
International Preliminary Report on Patentability with Amended Sheets for PCT/DE2016/100471, dated Oct. 12, 2017, 16 pages.
Machine Translation of Search Report dated Dec. 22, 2016 in German Application No. 102015117860.5, 7 pages.
Chinese Office Action and its English Machine Translation for Chinese Application No. 201680058818.6, 12 pages, dated Mar. 6, 2019.
Russian Office Action and its English translation for Russian Application No. 2018114260/11(022292), 10 pages, dated Feb. 20, 2019.

* cited by examiner

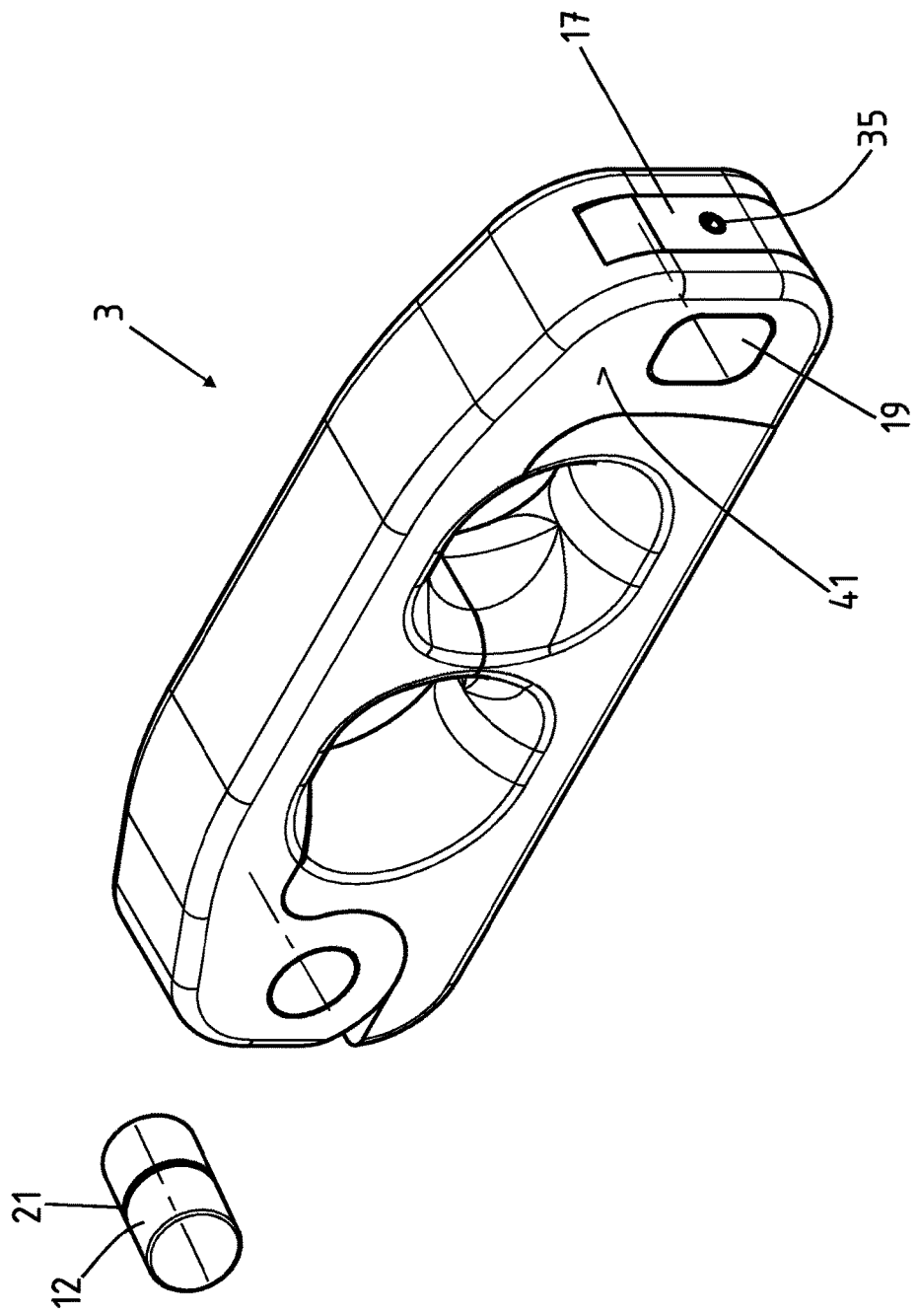

PIVOTABLE BLOCK LOCK

CROSS REFERENCE TO RELATED APPLICATIONS

The present application is a National Phase of International Application Number PCT/DE2016/100471 filed Oct. 11, 2016, which designated the U.S. and claims priority from German Patent Application Number DE 10 2015 117 860.5 filed Oct. 20, 2015, the entire contents of each of which are hereby incorporated by reference.

BACKGROUND

1. Field of the Invention

The disclosure is related to a pivotable block lock and, more specifically, to a block lock for connecting two chain links.

2. Description of the Related Art

In various applications relating to conveying technology, but also for lifting, pulling and lashing purposes, use is made of chain locks in order to connect two chain links, usually at a respective chain end, to one another.

For this purpose, for example DE 20 2014 103 197 U1 discloses a block lock of the generic type which has elongate block-lock halves which are connected to one another such that they can be rotated about the vertical axis of the block lock and, in the locked state, come into form-fitting abutment to form two accommodating openings.

In addition, for example DE 78 01 526 U1 discloses an attachment and connecting element which is intended for chains and in which rotatable hooks are arranged in order to accommodate a respective chain end.

FR 501 840 A discloses a chain lock in which two link plates located parallel one beside the other are connected to one another in a rotatable manner. The link plates arranged parallel one beside the other can be locked by the insertion of pins and/or by chain links being fitted in.

Furthermore, WO 2013/163 280 A1 discloses a disconnect device for chain connections, in particular for use in marine environments.

The block locks in question transmit high tensile forces in the longitudinal chain direction and are sometimes bulky and difficult for a fitter to handle. A block lock easily weighs a number of kilograms, in particular more than 10 kg. The weight of the chain ends is added to this.

SUMMARY

It is therefore the object of the present invention to simplify a block lock in terms of handling, while at least maintaining, if not enhancing, the possibility of transmitting the tensile force between the chain links which are to be connected.

According to one exemplary embodiment, a block lock is provided for connecting two chain ends, wherein, in the locked state, the block lock has two opposite block-lock halves which extend in the longitudinal direction, interengage in a form-fitting manner and lock to form at least one accommodating opening, preferably two accommodating openings, for accommodating a chain link. When the block-lock halves are locked, it is therefore the case that the chain links of each chain end are locked in a joint accommodating opening. It is preferable, however, for two accommodating openings to be formed, and therefore each chain link is mounted in an accommodating opening.

The block lock comprises block-lock halves which are coupled to one another in a pivotable manner in the region of a pivoting end of the block lock, and therefore, when executing the pivoting movement, the block-lock halves can be transferred into an open position or locked position, wherein, in the locked position, the block-lock halves interengage in a form-fitting manner at an opposite, locking end and can be locked.

The pivoting movement is thus executed in accordance with the principle of the opening movement of a pair of scissors. In the open position, the two block-lock halves are arranged preferably in a V-shaped manner and/or, depending on the opening angle, in an L-shaped manner. As a result, the fitter can use just one hand to hold the two block-lock halves, which are coupled to one another in captive fashion, but such that they can be pivoted relative to one another. He can then position, or insert, the respective chain links of the chain ends which are to be connected. It is preferably the case, for this purpose, that at least part of the accommodating opening is already formed on a block-lock half.

Once the two ends of the chain have been coupled, the pivoting movement can be executed and the block lock can be locked. A high level of tensile-force transmission in the longitudinal chain direction is achieved by virtue of the two block-lock halves engaging in one another in each case in a form-fitting manner in the region of the pivoting end and in the region of the locking end. The handling is simplified to a considerable extent by the capability of the two block-lock halves to pivot relative to one another in order to assume an open position or locked position.

In the case of two accommodating openings being formed, these are separated from one another in the locked position by a central crosspiece extending from one block-lock half to the opposite block-lock half. For this purpose, preferably part of the central crosspiece is formed on each block-lock half. Preferably therefore 50% of the extent of the central crosspiece is formed on one block-lock half and the other 50% of the extent of the central crosspiece is formed on the other block-lock half. It would also be possible for the division to be made in any other desired ratio, for example 10% to 90% or 30% to 70%. Within the framework of the invention, it would also be conceivable for the entire central crosspiece to be formed on just one block-lock half and then, in the locked position, for one end of the central crosspiece to come into form-fitting abutment against the other block-lock half. It is likewise conceivable for the central crosspiece to provide form-fitting locking in the locked position, so that the tensile force which is to be transmitted is further increased.

In addition, it is particularly preferred for the pivoting movement for assuming the open position to be limited in a form-fitting manner, preferably at an angle of the block-lock halves in relation to one another in the open position of smaller than or equal to 150 degrees, in particular smaller than or equal to 120 degrees, preferably smaller than or equal to 100 degrees, preferably smaller than or equal to 90 degrees and in particular smaller than 70 degrees. This avoids, in particular, the situation where the block-lock halves swing over in relation to one another when executing the opening movement. For example, as they assume the open position, it is not therefore possible for the two block-lock halves to swing open in relation to one another by an angle of 180 degrees or more. In particular, as a result, once again the handling for fitting the respective chain ends into the block lock is simplified and in addition the operational reliability when use is made of the block lock is increased.

In particular, in the region of the pivoting end, one block-lock half has a central rib rising up in relation to the elongate body and the other block-lock half has two fork ribs rising up in relation to its longitudinal body. When the block lock is put together, the central rib is then arranged to engage between the fork ribs. For the pivotable connection of the two block-lock halves, a pivot pin is arranged to engage in a releasable manner through the central rib and the fork ribs. The pivoting movement for assuming the open position and/or closed position is then executed about the pivot pin, in particular the center longitudinal axis of the pivot pin.

The pivot pin is fixed in position in particular in a form-fitting manner in the central rib. In a preferred variant, the pivot pin has an at least partially, in particular fully, encircling groove, wherein a securing means can be inserted into the central rib and engages at least to some extent in a form-fitting manner in the groove. This prevents movement of the pivot pin in the longitudinal direction thereof. In particular in the case of a fully encircling groove, the pivot pin is mounted in a form-fitting, but rotatable, manner in the central rib. It is thus possible for the two block-lock halves to execute a pivoting movement relative to one another about the center longitudinal axis of the pivot pin. At the same time, however, the pivot pin is mounted such that it can be rotated relative to the two block-lock halves. This improves the possibility, in particular once the block lock has been brought into use, of the pivoting movement about the pivot pin being able to be executed. For example, if the pivot pin should tilt in the fork ribs, rotatability relative to the central rib is still possible.

On the opposite side of the block-lock half, a central extension is formed in the region of the locking end. The other block-lock half has a fork extension rising up in relation to its elongate body, wherein, in the locked position, the fork extension engages in a form-fitting manner, at least to some extent, around the central extension. When the two block-lock halves execute the pivoting movement in relation to one another, the central extension therefore engages in the fork extension.

In addition, it is particularly preferably the case that laterally projecting shoulders are formed at the transition of the elongate body of the block-lock half to the central extension, wherein, in the locked position, rear sides of the fork extension of the other block-lock half, the rear sides being located in the direction of the accommodating opening, butt in a form-fitting manner against the shoulders. This also results, once again, in the tensile force which is to be transmitted at least being maintained, or even increased, at least in relation to known block locks.

The shoulders have a curved progression in relation to the opposite block-lock half, wherein the arc of curvature is oriented in the direction of the locking end. The rear sides of the fork extension have a curved progression which is arranged inversely in relation to the curved progression of the shoulders, and therefore, in the locked position, there is full surface abutment in the region of the resulting contact surface between the two curvatures. It is preferably the case that at least part of the radius of curvature of the shoulders is designed to stem from the distance to the center longitudinal axis of the pivot pin.

In addition, it is particularly preferable for the block lock to have a locking element in the region of the locking end, it being possible for the locking element to be inserted in a form-fitting manner with engagement through the block lock from one side to the other side.

However, it is also conceivable for the locking element to be secured in some other way, for example by being seated in a form-fitting manner.

It is particularly preferred for the locking element to be designed in the form of a block-like, particularly preferably solid, body. In addition, it is particularly preferred for the block-like body to have a cross section which is of quadrilateral design and quite particularly preferably is rectangular, wherein the corners themselves are rounded. In particular the rectangular cross-sectional shape thus makes it possible for the locking element to be introduced properly in a correctly positioned manner, without any risk of mix-up, into a corresponding locking opening in order to assume the locked position. In addition, it is particularly preferable for the longer side of the rectangle to run from an upper side to a lower side of the block lock. This gives rise to a higher resistance moment against opening. The shorter side of the rectangle, as seen in cross section, then runs in the longitudinal chain direction, and therefore as much material of the two block-lock halves as possible is present in the region of the locking end in order to transmit a high tensile force.

BRIEF DESCRIPTION OF THE DRAWINGS

For an understanding of embodiments of the disclosure, reference is now made to the following description taken in conjunction with the accompanying drawings, in which:

FIG. 10 shows an associated perspective view of the block lock in the locked position; and, FIGS. 11a to 11c show the locking element in accordance with an exemplary embodiment.

In the figures, the same reference designations are used for identical or similar components, even if a repeated description is omitted for reasons of simplicity.

DETAILED DESCRIPTION OF SOME EMBODIMENTS

Some embodiments will be now described with reference to the Figures.

Figure 1:
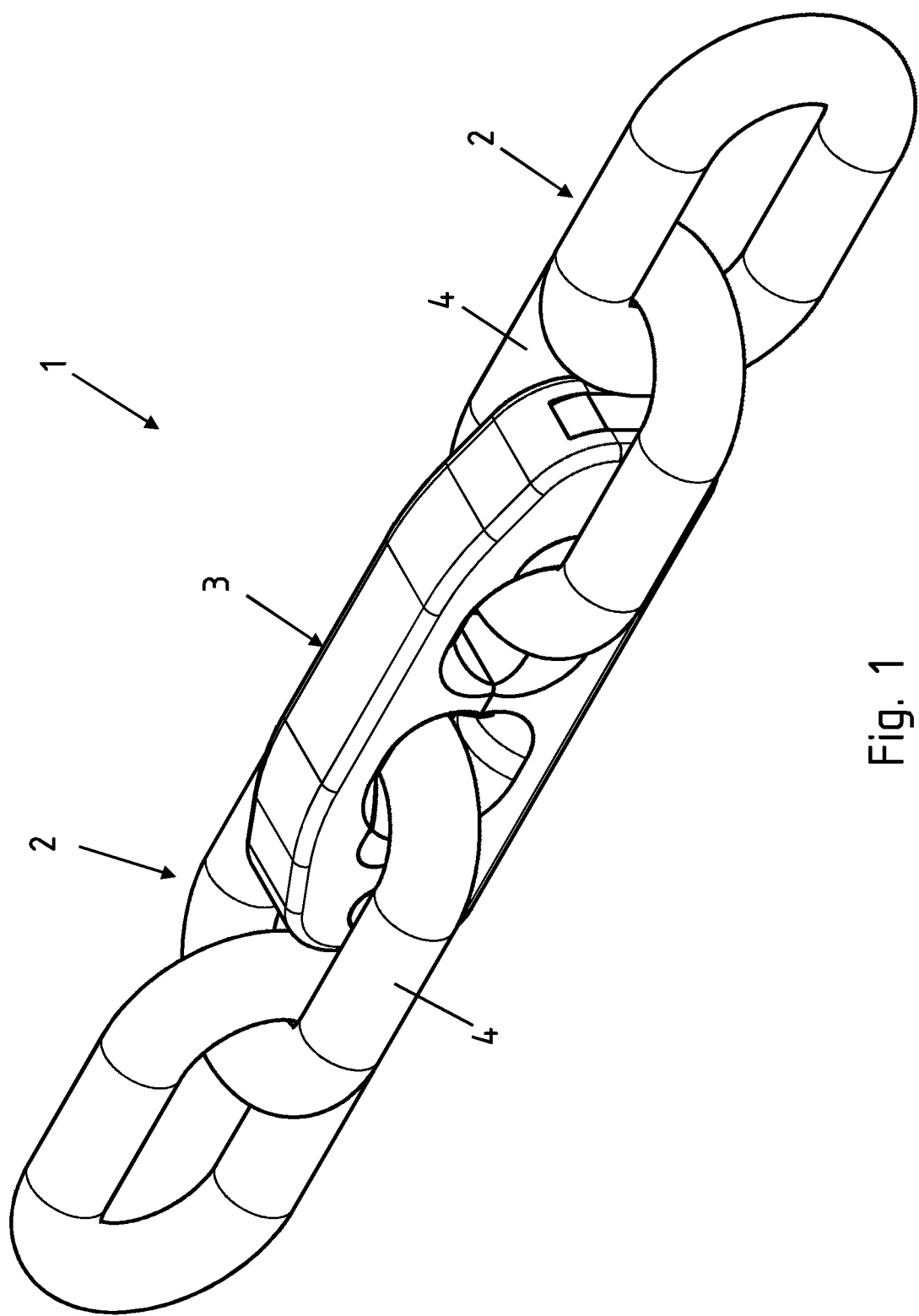
FIG. 1 shows a perspective view of a locking arrangement for two chain ends using a block lock in accordance with one exemplary embodiment.
Figure 2:
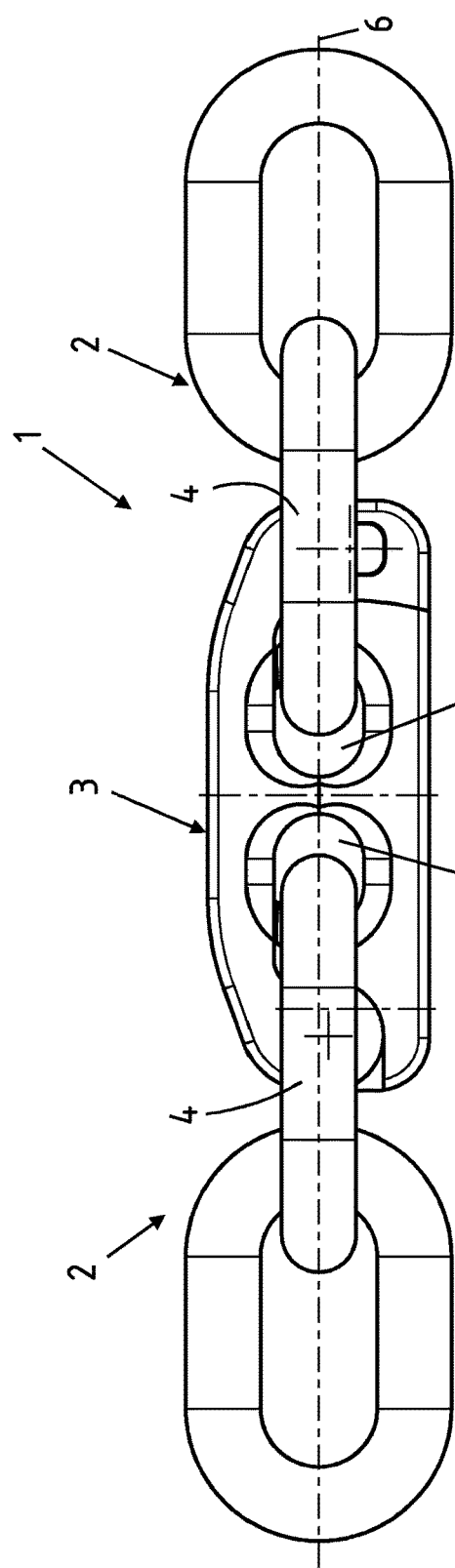
FIG. 2 shows a side view of the locking arrangement shown in FIG. 1.
Figure 3:
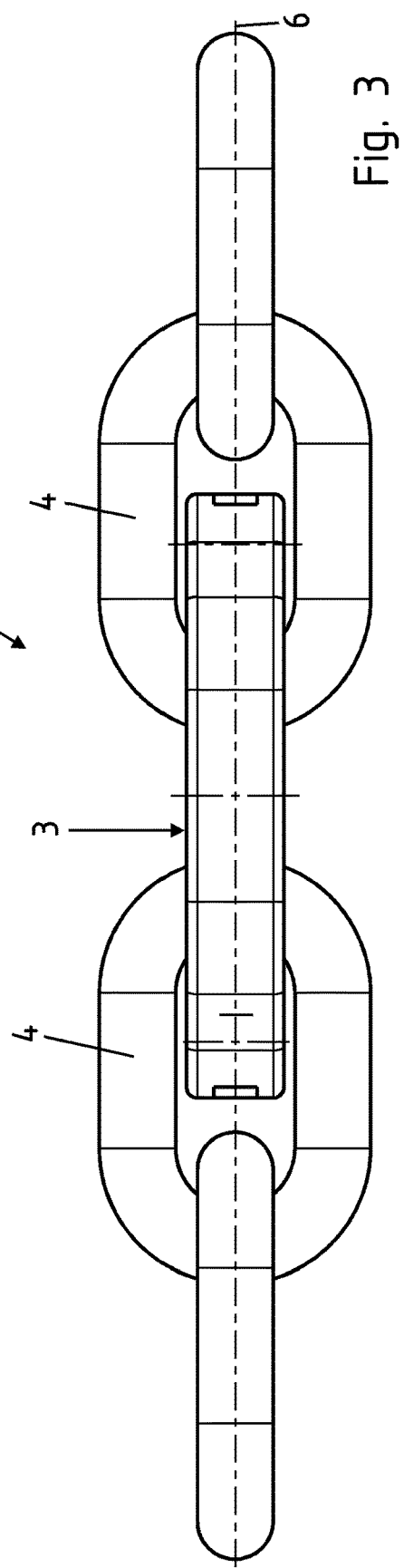
FIG. 3 shows a plan view of the locking arrangement shown in FIG. 1.

Referring now to FIGS. 1, 2, and 3, a locking arrangement 1 for two chain ends 2 is illustrated using a block lock 3. The final chain links 4 of the respective chain end 2 are accommodated in an accommodating opening 5 of the block lock 3. A tensile force can thus be transmitted in the longitudinal chain direction 6.

Figure 4:
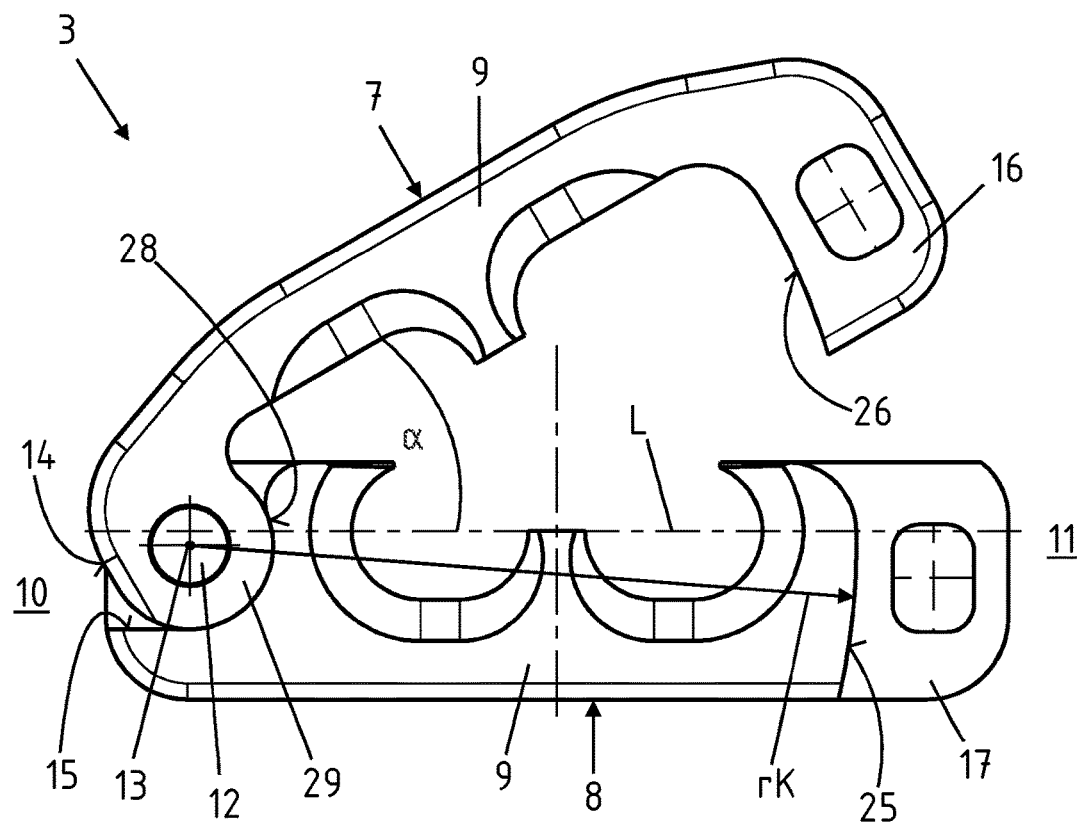
FIG. 4 shows a side view of the block lock in accordance with one exemplary embodiment in the open state.

FIG. 4 illustrates a side view of the block lock 3 according to one exemplary embodiment. It can clearly be seen that an upper block-lock half 7, as seen in relation to the image plane, and a lower block-lock half 8, as seen in relation to the image plane, each has an elongate body 9. A pivoting end 10 is formed on the left-hand side, as seen in relation to the image plane, and a locking end 11 is formed on the right-hand side, as seen in relation to the image plane. The longitudinal direction L of the block lock 3 is also shown.

A pivot pin 12 has been inserted in the region of the pivoting end 10 so as to engage through the block-lock halves 7, 8 in this region. This pivot pin 12 has a pivot axis 13, about which the two block-lock halves 7, 8 are mounted such that they can be pivoted relative to one another according to the invention. It is thus possible to pivot the two block-lock halves 7, 8 relative to one another in order to assume an open position or else a locked position.

In the open position, the two block-lock halves 7, 8 are at an angle α in relation to one another. This angle α is preferably limited. This limitation is brought about, in particular, by a form fit: when the maximum open position desired is reached, a rear shoulder 14 of the upper block-lock half 7 comes to bear in a form-fitting manner on a bearing surface 15 of the lower block-lock half 8. The angle α can be set then by the design of the shoulder 14 and bearing surface 15. Further opening, and therefore an increase in the angle α, is therefore no longer possible.

Figure 5:
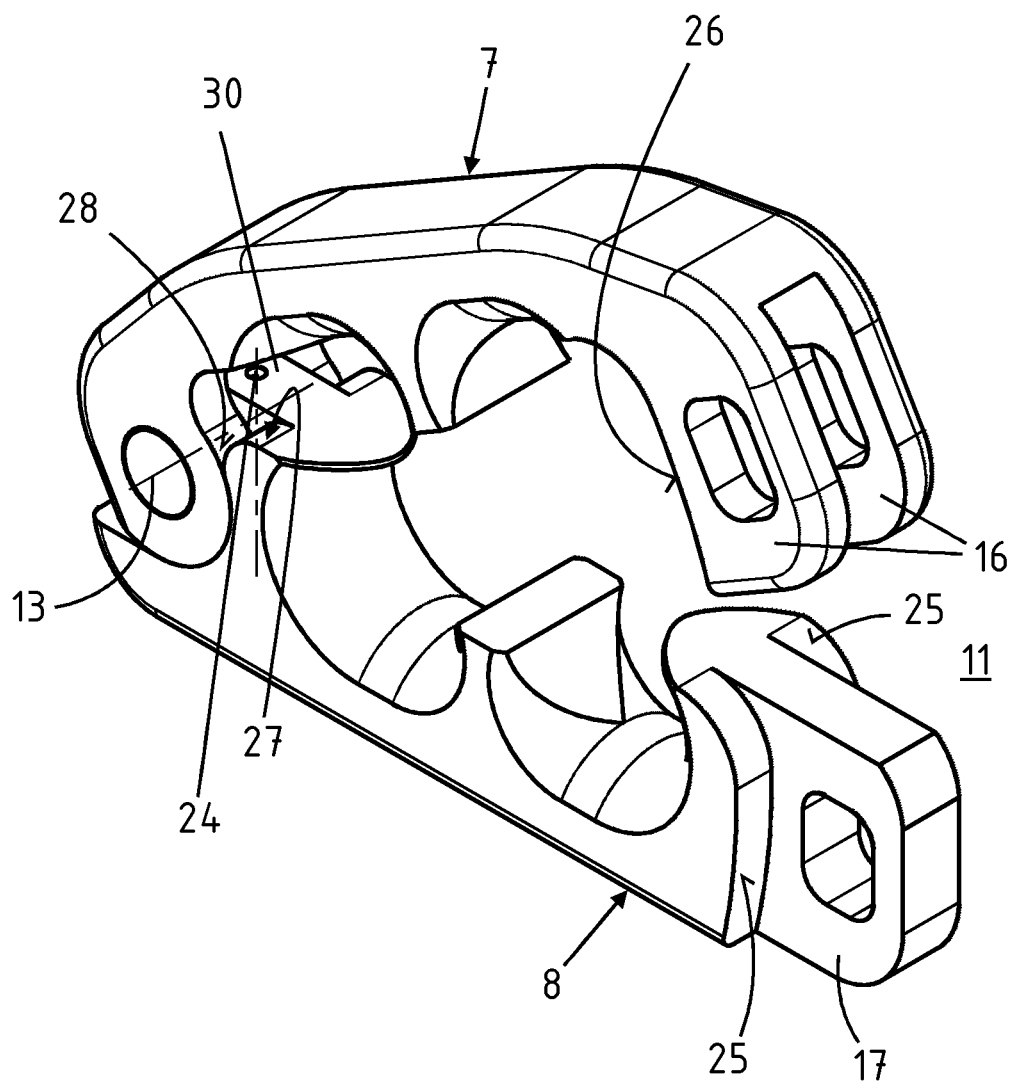
FIG. 5 shows a perspective view of the bock lock of FIG. 4 in the open state.

It can also clearly be seen that elevations in relation to the elongate body 9 are formed at a respective end of each block-lock half 7, 8. With reference to FIG. 5, which illustrates a perspective view of FIG. 4, a fork extension 16 is provided in the form of an elevation on the right-hand side of the upper block-lock half 7, as seen in relation to the image plane, in the region of the locking end 11. The elevation thus has two plate-like bodies projecting downward, as seen in relation to the image plane, in relation to the elongate body 9 of the upper block-lock half 7.

Figure 6:
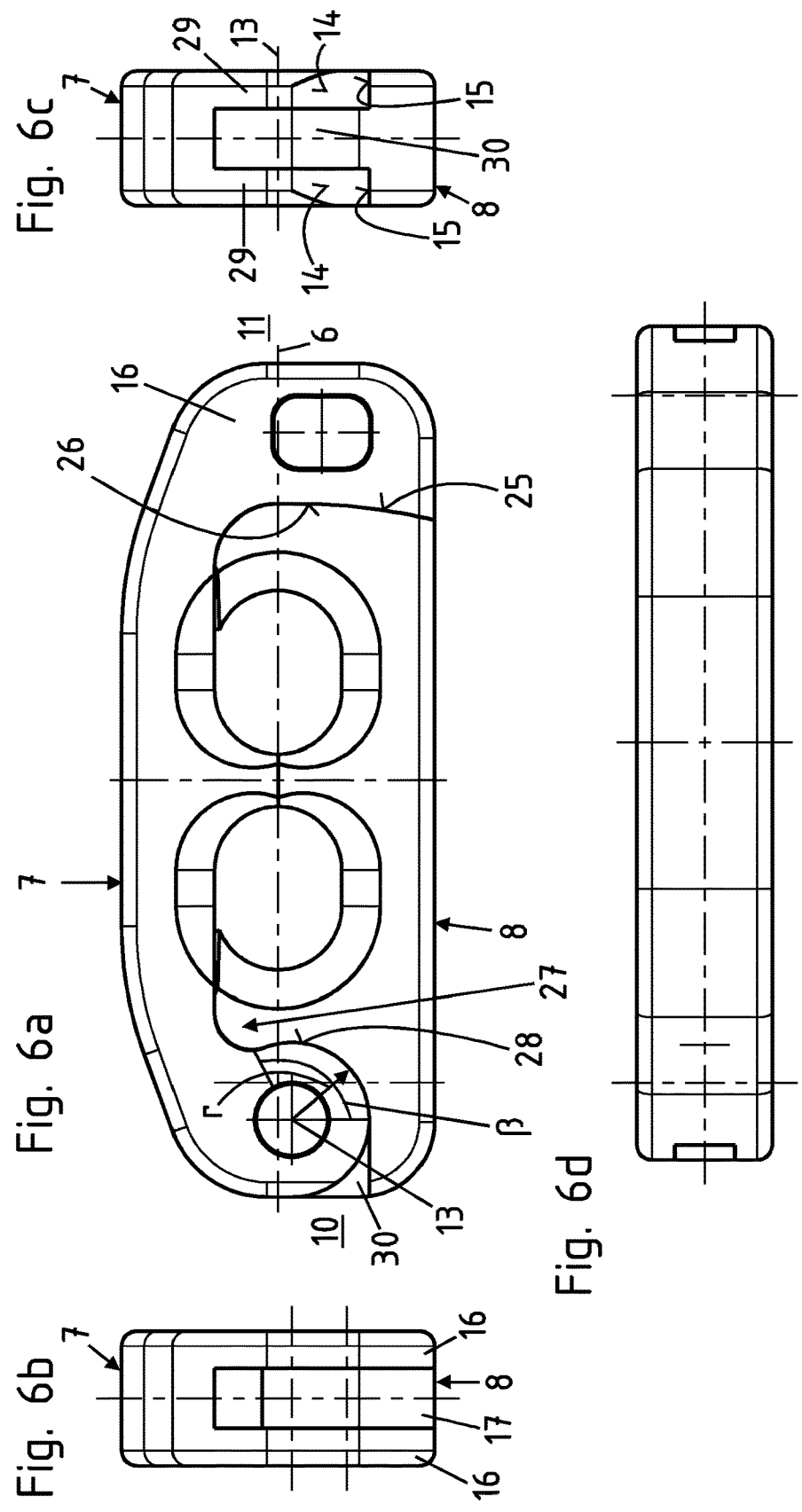
FIGS. 6a to 6d show various views of the block lock in accordance with an exemplary embodiment.

The elevation of the lower block-lock half 8 is designed at least to some extent in the form of a central extension 17, wherein, in the locked position according to FIG. 6b, the central extension 17 has the respective fork extension 16 engaging in a form-fitting manner around it on either side. A locking element 18, which is illustrated in FIG. 7 and FIG. 8, is then inserted in the region of the locking end 11 so as to engage through the fork extension 16 and the central extension 17 from each side of the two block-lock halves 7, 8.

Figure 7:
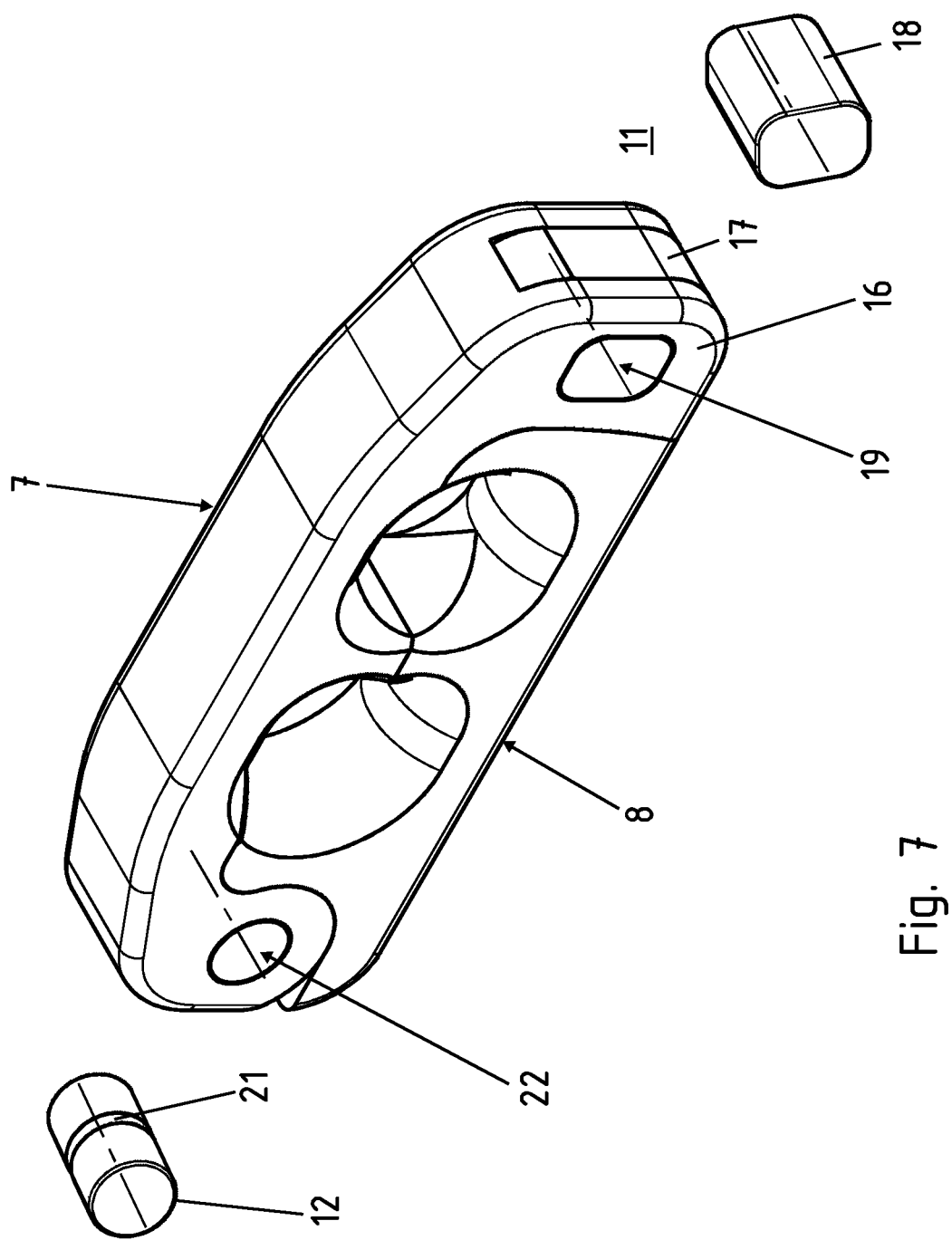
FIG. 7 shows a perspective view of the block lock in accordance with one exemplary embodiment with the pivoting element and locking element arranged separately.
Figure 8:
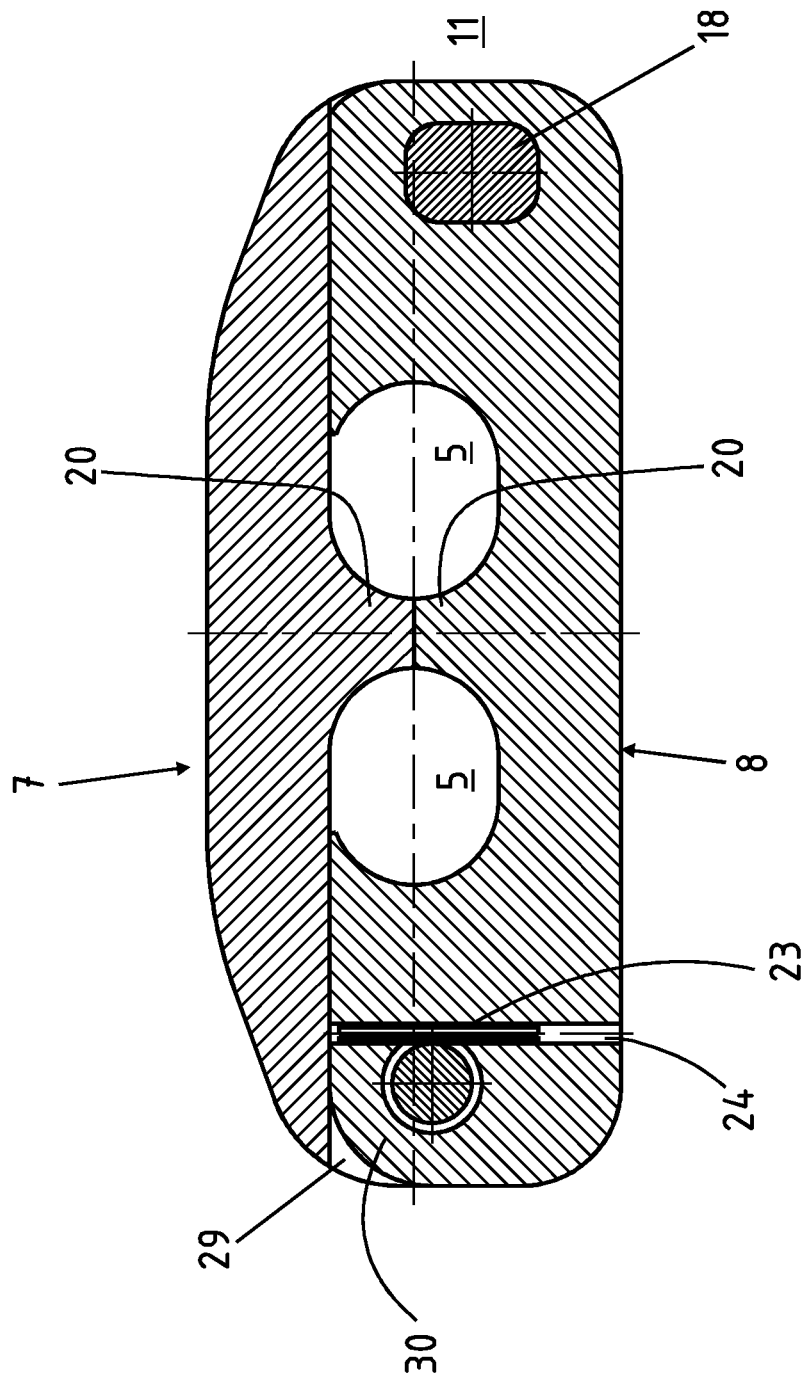
FIG. 8 shows a longitudinal-section view through the block lock, in accordance with one exemplary embodiment in the locked position.

The locking element 18 itself is designed in the form of a block-like body, which is illustrated in FIG. 7. The locking element 18 has, in particular, a cross-sectional configuration which, as can be seen from FIG. 8, is designed in the form of a rectangle with rounded corners. It can also clearly be seen according to FIG. 8 that the two block-lock halves 7, 8 have part of a central crosspiece 20, this therefore resulting in the two accommodating openings 5 being formed in the locked state.

In order that the pivoting movement of the two block-lock halves 7, 8 can be executed, the pivot pin 12 is designed in the form of a cylindrical body which, in turn, particularly preferably has an encircling groove 21. It is therefore possible for the pivot pin 12 to engage through the two block-lock halves 7, 8 and to be inserted into a pivot-pin openings 22 and, as can also clearly be seen in FIG. 8, to be secured in its axial direction by a securing means 23, for example in the form of a split pin or of a grub screw, against slipping out of the block-lock halves 7, 8. The pivot pin 12 therefore cannot be displaced axially in the direction of the pivot axis 13. At the same time, however, this securing measure still makes it possible for the pivot pin 12 to move relative to the upper block-lock half 7 and to move relative to the lower block-lock half 8. An opening 24 through which the securing means 23 can be inserted and driven out passes all the way through the elevation of the lower block-lock half 8, which can clearly be seen according to FIGS. 8 and 5.

In order that the block-lock half 7, 8 according to the invention can transmit at least the same, or increased, tensile forces, provision is also made for shoulders 25 to be formed in the region of the locking end 11, at the transition to the central extension 17. These shoulders 25 have a curved progression, wherein a radius of curvature rK rotates preferably about the pivot axis 13. For this purpose, the fork extension 16 has rear sides 26, wherein, in the locked position, as can clearly be seen in FIG. 6a, the rear sides 26 come into form-fitting abutment against the shoulders 25, preferably over the entire region of the resulting abutment surface. The tensile force to be transmitted in the longitudinal chain direction 6 is thus increased.

An abutment shoulder 27 oriented at least to some extent in the direction of the pivot axis 13 is likewise formed in the region of the pivoting end 10, on the elevation of the lower block-lock half 8, and this abutment shoulder, in the locked state, comes into form-fitting abutment with an abutment surface 28 of the upper block-lock half 7. The abutment surface 28 here is formed on fork ribs 29 of the upper block-lock half 7, the fork ribs engaging laterally in a form-fitting manner around a central rib 30 of the lower block-lock half 8, in order to prevent axial sliding in the direction of the pivot axis 13. This is illustrated to good effect in FIG. 6c. In particular the abutment surface 28 therefore runs at least to some extent with a constant radius r about the pivot axis 13, preferably over an angle range β of greater than 90 degrees, particularly preferably between 100 degrees and 150 degrees. As a result, the surface area which is formed between the abutment shoulder 27 and abutment surface 28 in the locked state is maximized and therefore, in the region of the pivoting end 10, the possible tensile force to be transmitted in the longitudinal chain direction 6 is, in turn, increased.

Figure 9:
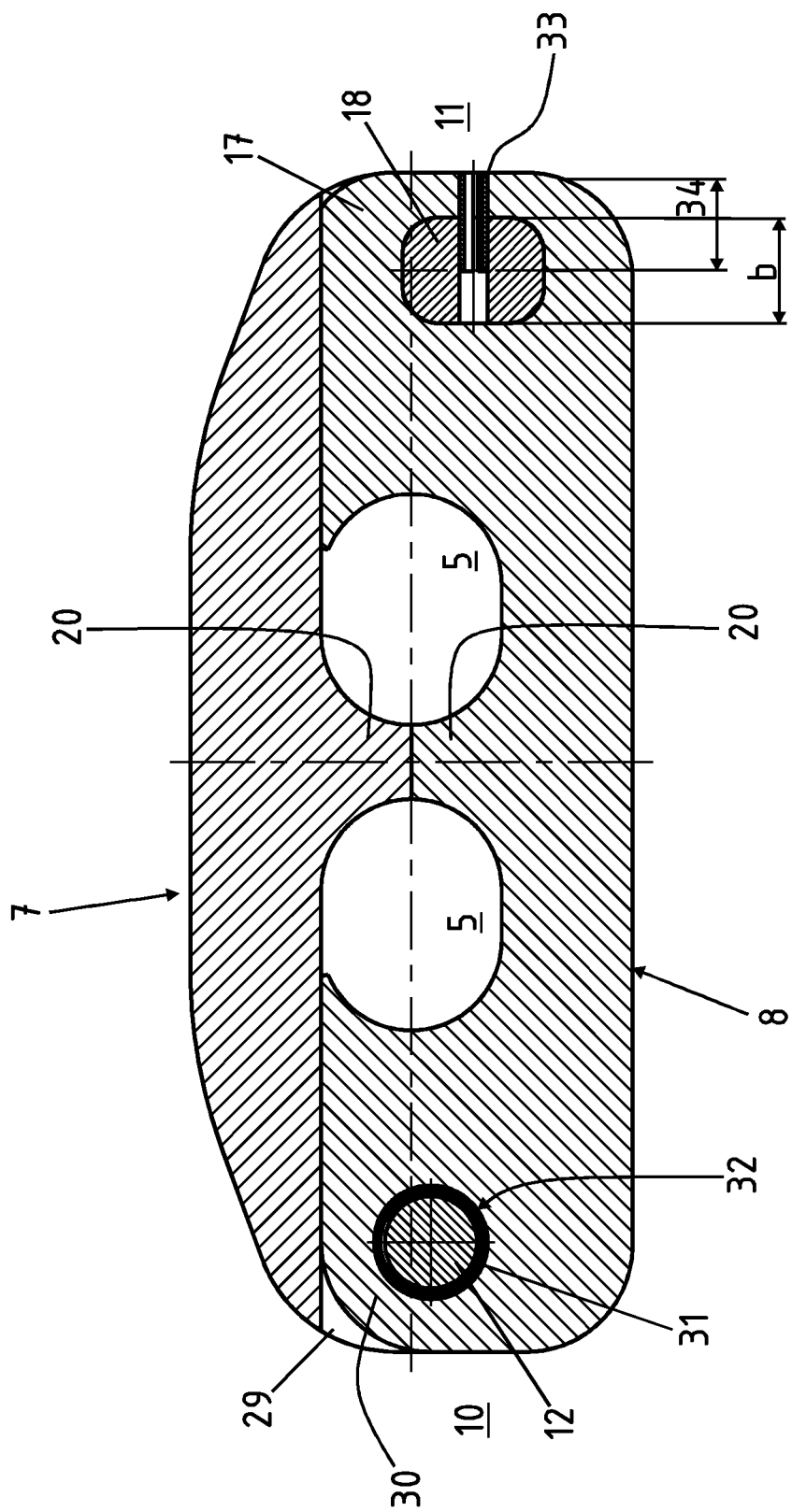
FIG. 9 shows a longitudinal-section view of an alternative embodiment of a block lock.

FIG. 9 shows a longitudinal-section view of an alternative variant of the block lock 3. On the left-hand side, as seen in relation to the image plane, the pivot pin 12 here is secured against axial displacement not by a securing means 23, as in FIG. 8, but by a retaining ring 31 arranged in the groove 21 of the pivot pin 12. For the insertion of the pivot pin 12, the retaining ring 31 is thus pressed together, or compressed, in its radial direction and introduced into the pivot-pin opening 22. According to the longitudinal section of FIG. 9, the pivot-pin opening 22 thus has an encircling retaining-ring groove 32 in the region of the central rib 30. Once the pivot pin 12 has been pushed in axially to the extent where the retaining ring 31 has reached the retaining-ring groove 32, the retaining ring 31 expands radially and therefore engages in the retaining-ring groove 32 and, at the same time, also the groove 21 of the pivot pin 12. The pivot pin 12 is thus secured against axial displacement.

Another exemplary embodiment of the locking element 18 is illustrated on the right-hand side, as seen in relation to the image plane of FIG. 9. The locking element is likewise designed in the form of a rectangular bolt with rounded corners. As illustrated in FIG. 9, it is secured against axial displacement by a spring pin 33 introduced into the locking element 18 and central extension 17. The spring pin 33 has a length 34 which is smaller than or equal to, in particular smaller than, the width b of the locking element 18. It is therefore possible, for the purpose of removing the locking element 18, for the spring pin 33, in a spring-pin opening 35 illustrated in FIG. 10, to be pushed or driven into the locking element 18 to the left, as seen in relation to the image plane of FIG. 9. It is then possible for the locking element 18 to be pushed or driven in its axial direction out of the locking opening 19. On account of it being of shorter length 34 in relation to the width b of the locking element 18, the spring pin 33 does not project beyond a side of the locking element 18.

The alternative variants for the pivot pin 12, but also for the locking element 18, can be combined, each in their own right, with the above described features of the block lock 3.

FIG. 10 shows a perspective view in relation to FIG. 9. The groove 21 of the pivot pin 12 and the spring-pin opening 35 in the central extension 17 can clearly be seen.

Figure 11C:
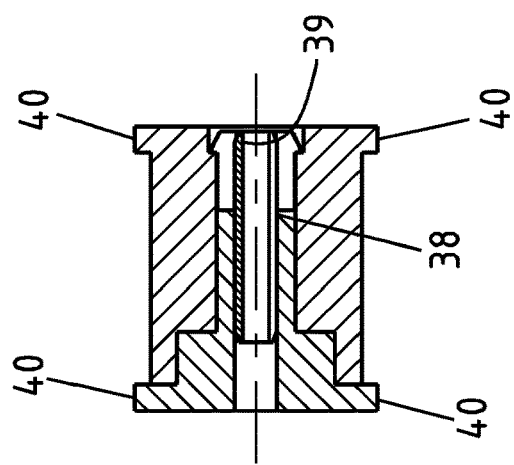
Figure 11B:
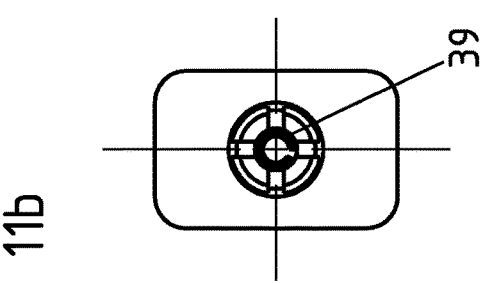
Figure 11A:
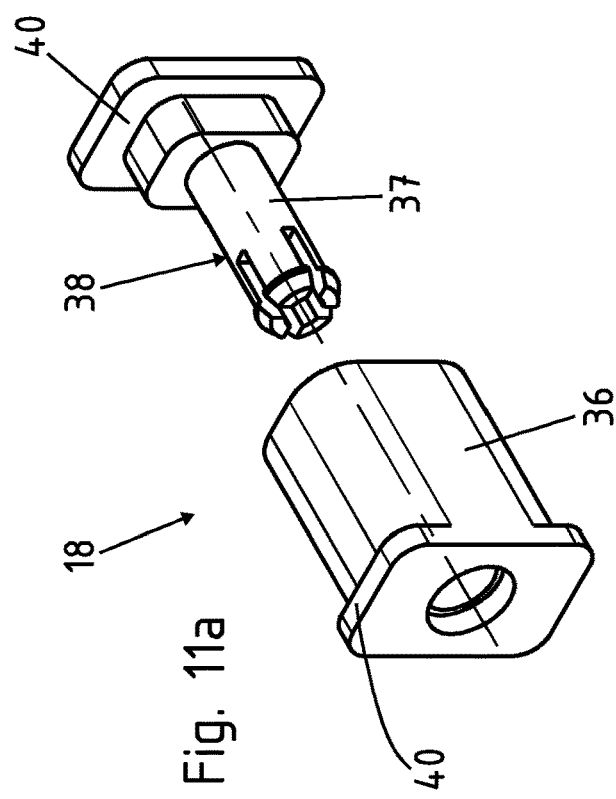

FIGS. 11a to c show an alternative variant of the locking element 18. The latter is of multi-part design here, wherein a basic body 36 performs the actual function of the locking element 18, and can be introduced in a form-fitting manner into the locking opening 19 from one side. For this purpose, a securing body 37 has a pin extension 38 with a snap-action closure, which is inserted into the basic body 36 from the other side of the block lock 3. In the locked state, a spring pin 39 is inserted into the pin extension 38 with snap-action closure, and therefore the snap-action closure cannot be pushed together in the radial direction. For removal purposes, then, the spring pin 39 is pushed or driven out of the pin extension 38 and the securing body 37 can be driven out of the basic body 36. Both the basic body 36 and the securing body 37 have side flanks 40, which come into form-fitting abutment against side surfaces 41 of the block lock 3, the side surfaces being indicated in FIG. 10, and retain the locking element 18 in a form-fitting manner in its axial direction in the locking opening 19.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A block lock for connecting two chain ends, comprising:
  a first block-lock half extending in a longitudinal direction (L);
  an opposing second block-lock half each extending in the longitudinal direction (L) when the block lock is in the locked configuration,
  each block-lock half including at least one opening for accommodating a chain link when the block-lock is in a locked configuration;
  wherein the first and the second block-lock halves are pivotally connected to one another at one end, and are secured at an opposing second end when in the locked configuration,
  wherein the pivot pin has a groove around an outer circumference thereof, wherein a securing means is inserted into the central rib and engages with the groove, thereby preventing the movement of the pivot pin in the longitudinal direction.

2. The block lock of claim 1, wherein the at least one accommodating opening comprises two accommodating openings formed by a central crosspiece extending from the first block-lock half to the opposite second block-lock half, wherein part of the central crosspiece is integrally formed on each of the first block-lock half and the second block-lock half.

3. The block lock of claim 2, wherein the first block-lock half and the second block-lock half are at an angle ($\alpha$) relative to the longitudinal direction (L), wherein the angle ($\alpha$) is smaller than or equal to 120 degrees when the first and second block-halves are in an open configuration.

4. The block lock of claim 1, wherein the first block-lock half includes a central rib extending from a first end thereof; wherein the second block-lock half includes a fork-shaped rib extending from a first end thereof, a pivot pin, wherein the central rib is pivotally mounted on the fork-shaped rib with the pivot pin.

5. The block lock of claim 3, wherein the angle ($\alpha$) is smaller than or equal to 100 degrees, particularly preferably smaller than or equal to 90 degrees and in particular smaller than 70 degrees.

6. A block lock for connecting two chain ends, comprising:
  a first block-lock half extending in a longitudinal direction (L);
  an opposing second block-lock half each extending in the longitudinal direction (L) when the block lock is in the locked configuration,
  each block-lock half including at least one opening for accommodating a chain link when the block-lock is in a locked configuration;
  wherein the first and the second block-lock halves are pivotally connected to one another at one end, and are secured at an opposing second end when in the locked configuration, wherein the first block-lock half has a central extension at a second end thereof, and the second block-lock half has a fork-shaped extension at a second end thereof, wherein, the fork-shaped extension engages the central extension in a form-fitting manner.

7. A block lock for connecting two chain ends, comprising:
  a first block-lock half extending in a longitudinal direction (L);
  an opposing second block-lock half each extending in the longitudinal direction (L) when the block lock is in the locked configuration,
  each block-lock half including at least one opening for accommodating a chain link when the block-lock is in a locked configuration;
  wherein the first and the second block-lock halves are pivotally connected to one another at one end, and are secured at an opposing second end when in the locked configuration, wherein the first block-lock half has a central extension at a second end thereof, and the second block-lock half has a fork-shaped extension at a second end thereof, wherein, the fork-shaped extension engages the central extension in a form-fitting manner, wherein the laterally projecting shoulders are formed at the transition to the central extension, wherein, in the locked position, rear sides of the fork extension, said rear sides being located in the direction of the accommodating opening in a form-fitting manner against the shoulders.

8. The block lock of claim 7, wherein the shoulders have a curved progression in relation to the opposite block-lock half, and in that in particular the rear sides of the fork extension have a curved progression which runs inversely in relation to the curved progression of the shoulders, and therefore, in the locked position, there is full surface abutment in the region of the resulting contact surface, and wherein an arc of curvature of the shoulder is oriented in the direction of the locking end.

9. The block lock of claim 8, wherein a locking element can be inserted in a form-fitting manner in the region of the locking end with engagement through the fork extension and the central extension and optionally being secured by a spring pin against displacement in the axial direction, wherein the spring pin preferably has a length which is shorter than a width (b) of the locking element.

10. The block lock of claim 9, wherein the locking element is a quadrilateral block-like body.

11. The block lock of claim 9, wherein the quadrilateral block-like body is rectangular in cross section, and wherein comprises corners which are rounded.

\* \* \* \* \*